A. P. STOCKER.
WHEEL.
APPLICATION FILED JUNE 8, 1914.

1,221,242.

Patented Apr. 3, 1917.
2 SHEETS—SHEET 1.

WITNESSES

INVENTOR
Albert P. Stocker

A. P. STOCKER.
WHEEL.
APPLICATION FILED JUNE 8, 1914.
1,221,242.
Patented Apr. 3, 1917.
2 SHEETS—SHEET 2.
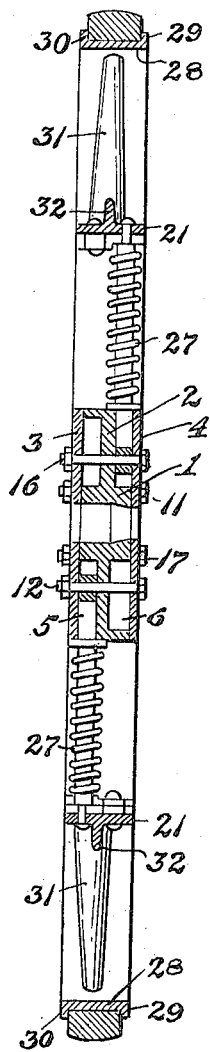
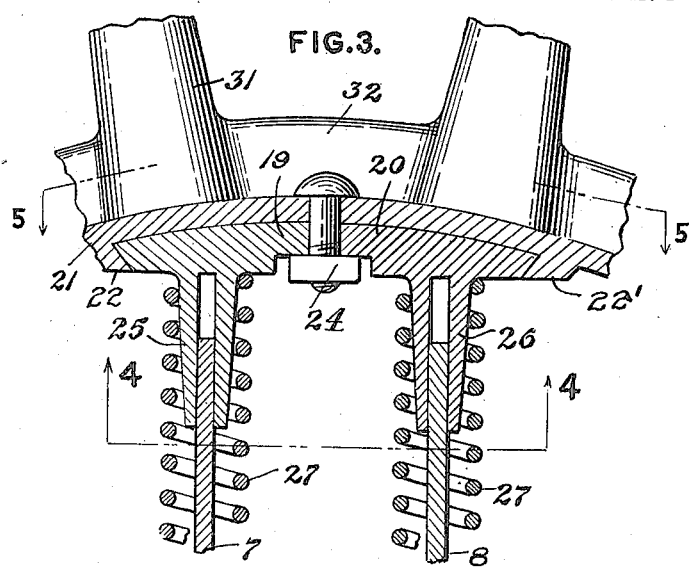
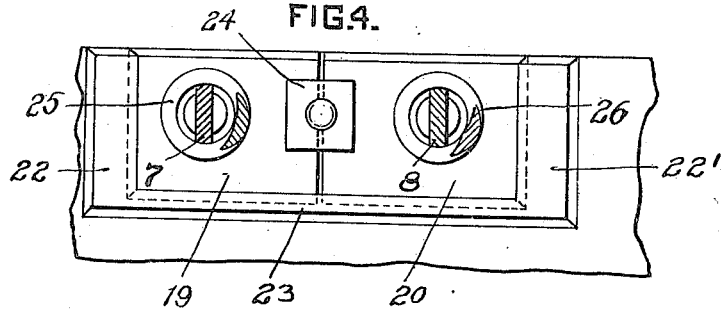
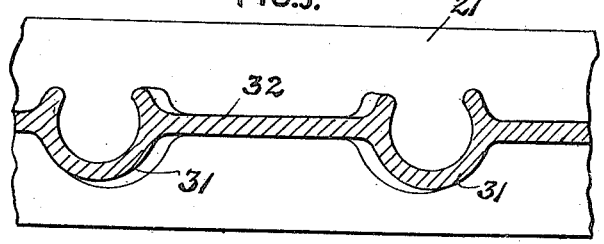
WITNESSES
P. E. Gaither
B. F. Sims
INVENTOR
Albert P. Stocker
By Habits & Doolittle
Attys.

UNITED STATES PATENT OFFICE.

ALBERT P. STOCKER, OF STRUTHERS, OHIO.

WHEEL.

1,221,242.  Specification of Letters Patent.  Patented Apr. 3, 1917.

Application filed June 8, 1914. Serial No. 843,663.

*To all whom it may concern:*

Be it known that I, ALBERT P. STOCKER, a citizen of the United States, residing at Struthers, in the county of Mahoning and State of Ohio, have invented certain new and useful Improvements in Wheels, of which the following is a specification.

This application is in part a continuation of an application filed by me on or about May 28, 1913, Serial Number 770,535.

It is the purpose of my invention to provide a construction of wheel which will have all of the advantages of a wheel employing a pneumatic tire without its inherent disadvantages. In constructing my invention, I aim to provide means whereby the resiliency of the wheel will not affect the durability thereof, and further, I aim to so construct the wheel that repairs may be made expeditiously and without necessarily disassembling the entire wheel.

In the drawings:—

Fig. 2 is a sectional view on line 2—2 of Fig. 1;

Fig. 3 is an enlarged fragmentary sectional view of a part of the wheel rim showing the spoke-receiving thimbles in section;

Fig. 4 is a sectional view on line 4—4 of Fig. 3; and

Fig. 5 is a sectional view on the line 5—5 of Fig. 3.

Figure 1:
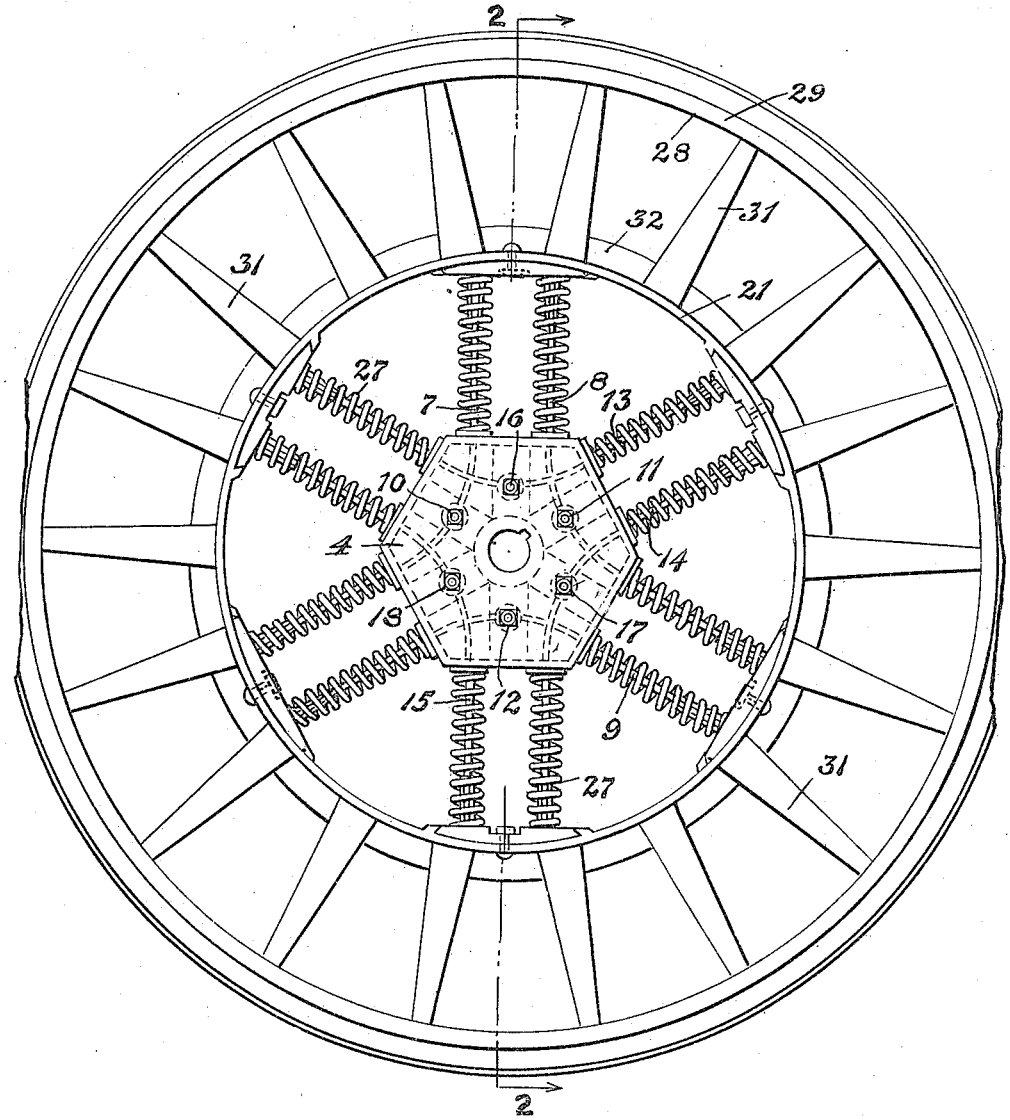
Figure 1 is an elevational view of a wheel constructed in accordance with my invention.

In the present embodiment of my invention I have illustrated the hub as comprising an axle-receiving sleeve 1 provided with a peripheral flange 2, the sleeve being secured between end plates 3 and 4 which are bolted to the flange 2 and which constitute spoke-receiving recesses 5 and 6.

The perimeter of the hub, that is, the plates and flanges, are polygonal, in the present instance hexagonal as shown in Fig. 1, and from each face of the hub are radially disposed approximately parallel spokes. The spokes are shown as consisting of two sets of arcuately bent or bowed flat springs radiating from the hub, one set being offset with relation to the other; pairs of spokes of one set alternating with pairs of spokes of the other set.

For example, in Fig. 1, one set of spokes consists of the spoke members or bowed springs 7, 8 and 9, which are secured in the recess 5 by the bolts 10, 11 and 12 which serve a dual purpose in that they not only secure the spoke members to the hub, but also simultaneously assist in securing the plates 3 and 4 to the flange of the sleeve 1. The complementary set of spokes designated 13, 14 and 15 are secured in the recess 6 by bolts 16, 17 and 18 which also serve to secure the plates 3 and 4 to the flange 2 of the sleeve member 1.

By reference to Fig. 1, it will be seen that the pairs of one set of spokes are substantially parallel and extend from one face of the polygonal hub member, the free ends of the spokes loosely engaging guides or recesses in thimbles secured to the inner ring of the wheel rim.

In Figs. 3 and 4, I have illustrated in detail one split spoke thimble, and as all of the remaining thimbles are of corresponding construction, a description of one will suffice for all. By reference to Figs. 3 and 4, it will be seen that each thimble consists of two parts 19 and 20 secured to the inner ring 21 of the rim by the chamfered rectangular base portions which are inserted in pairs in the under-cut thimble receiving sockets comprising flanges 22 and 22' connected by the under-cut flange 23 preferably integral with the ring 21.

A fastening device 24 comprising a nut and bolt is interposed between adjacent thimble members so that when the nut is screwed down upon the bolt, the two thimble members will be secured in proper position to receive the ends of adjacent spokes which engage inwardly projecting tubular portions or guides 25 and 26 of respective thimble members, permitting longitudinal play of the spoke members without lateral displacement.

Coiled springs 27 surround the outer ends of the respective spoke members and have one end bearing against a thimble and the other against one face of the hub. The rim is shown as comprising the inner ring 21 and an outer ring or felly 28 provided with tire-receiving flanges 29 and 30. These rings 21 and 28 are connected by approximately semi-circular spokes 31, the inner ring 21 being provided with an annular flange or rim 32 to add strength to the rim between the spokes and adjacent to the thimbles which it carries.

In actual practice, I may make the entire rim comprising the inner and outer rings, the spokes and the flanges, of a single piece, preferably by casting it of steel. This will provide a strong, light and durable rim which will withstand the wear and tear to which the wheel would be subjected.

From the foregoing, it will be apparent that the two sets of spring spokes are so disposed with relation to the other that the strains to which the wheel is subjected will be radially resisted, and that each set of spokes would carry its proportion of the load. This is due in part to the fact that one pair of spoke members is diametrically opposite to a pair of spoke members on the complementary set, and that each pair of spoke members of one set alternates with a similar pair of spoke members on the other set.

In the event that one of the bowed spoke members should become broken, or that it is desired to remove it for repair, it will be only necessary to take out the bolt which secures it to the hub and remove one thimble member, when the entire bowed member may be removed, together with the coil springs which surround it. This enables a quick repair to be made without disturbing the rest of the wheel.

As will be seen, each spoke 7 has its ends projected perpendicularly to two of the angular faces of the hub, with the ends of the projected portions seated within the guides 26. Consequently, the rim and hub are capable of relative movements in the direction of length of the projected portions of the spokes which correspond to a vertical line through the hub axis, these parts during this movement being supported practically by the compression members 27. This particular direction of movement provides the greater amount of strain on the structure. As the direction of relative movement at this point of greater strain is in a direction which substantially eliminates pressure on the projecting portions of that pair of spokes extending between the face and rim, it will be understood that this pressure or strain is placed mainly on the compression members, thereby relieving these particular spoke portions of excessive strain at this time. While other spoke portions are subjected to pressures at this time, by reason of the pressure being exerted in a direction angular to the direction of length of the spoke portion, the direction of application of pressure on such spoke portions is such as to tend to flex the spokes in directions which are not liable to injure them, it being understood that such pressure passes to the spokes gradually as the angularity increases, the increase of pressure on the spokes practically corresponding with the decrease of action of the compression members, so that the spring spokes and the compression members act as auxiliaries to each other to provide for maximum efficiency without placing the maximum pressure on the spokes in the direction of their length.

What I claim is:—

1. A wheel comprising a rim having the periphery thereof carrying a spoke structure, equally spaced thimbles secured to the inner sides of said rim and provided with sets of guides, a hexagon-shaped casing yieldably supported concentrically of said rim, flat springs extending from said casing and having the ends thereof extending in the guides of said thimbles, coiled compression springs encircling the ends of said flat springs and said guides and interposed between said thimbles and the walls of said casing, side plates carried by said casing, and means for simultaneously securing said side plates to said casing, and said flat springs within the casing.

2. A wheel comprising a polygonal hub, two sets of flat spring spokes, each flat spring forming two of such spokes and being bowed with the bowed portion fixedly carried by and movable with the hub, said spokes projecting perpendicularly to the angular faces of the hub, each hub face having a pair of spaced-apart spokes projecting therefrom, the spokes of a pair being of the same set, a rim positioned on the projecting portions of the spokes, and compression springs encircling the flat springs and disposed between the rim and hub adapted to cushion relative movements of hub and rim on lines corresponding to the direction of length of the projecting portions of the spokes.

3. A wheel comprising a polygonal hub, two sets of flat spring spokes, each flat spring forming two of such spokes and being bowed with the bowed portion fixedly carried by and movable with the hub, said spokes projecting perpendicularly to the angular faces of the hub, the spokes of one set alternating with those of the other set, the spokes projecting from a single hub face being of the same set, a rim positioned on the projecting portions of the spokes, and compression members between the rim and hub adapted to cushion relative movements of hub and rim on lines corresponding to the direction of length of the projecting portions of the spokes.

4. A wheel comprising a hub, two sets of bowed springs having their intermediate portions secured to the hub, a rim, thimbles on the rim and loosely engaged by the ends of the springs, and a single bolt for removably securing two adjacent thimbles to the rim.

In testimony whereof, I affix my signature in presence of two witnesses.

ALBERT P. STOCKER.

Witnesses:
H. L. WILSON,
W. N. WILSON.

Copies of this patent may be obtained for five cents each, by addressing the "Commissioner of Patents, Washington, D. C."